US006736088B1

(12) United States Patent
McGregor et al.

(10) Patent No.: US 6,736,088 B1
(45) Date of Patent: May 18, 2004

(54) ENTERTAINMENT ASSEMBLY FOR A CAGED ANIMAL

(75) Inventors: Douglas S. McGregor, 10700 Anderson Ave., Riley, KS (US) 66531; Holly K. Gersch, Versailles, KY (US)

(73) Assignee: Douglas S. McGregor, Riley, KS (US)

( * ) Notice: Subject to any disclaimer, the term of this patent is extended or adjusted under 35 U.S.C. 154(b) by 0 days.

(21) Appl. No.: 10/353,380

(22) Filed: Jan. 29, 2003

(51) Int. Cl.[7] .......................... A01K 29/00; A01K 39/01
(52) U.S. Cl. .................... 119/708; 119/51.03; 119/464; 119/467
(58) Field of Search .............................. 119/51.03, 57.8, 119/464, 467, 708; 116/141, 167; 84/402, 404; D10/118, 119

(56) References Cited

U.S. PATENT DOCUMENTS

| 2,707,937 | A | 5/1955 | Herman |
| 4,542,714 | A | 9/1985 | Ingraham et al. |
| D285,669 | S | 9/1986 | Brockmann |
| 4,854,214 | A | 8/1989 | Lowe |
| 4,967,633 | A | 11/1990 | Jewell, Jr. |
| 4,977,859 | A | 12/1990 | Kilham |
| 5,022,345 | A | 6/1991 | Bolivar et al. |
| 5,033,708 | A | 7/1991 | Brue et al. |
| 5,040,491 | A | 8/1991 | Yancy |
| 5,062,388 | A | 11/1991 | Kilham |
| 5,107,796 | A | 4/1992 | Embrey |
| D332,924 | S | 2/1993 | Schutze |
| 5,269,242 | A | 12/1993 | Toldi |
| D353,558 | S | 12/1994 | Scott |
| 5,503,108 | A | 4/1996 | Shaw |
| D370,183 | S | 5/1996 | Christensen |
| 5,587,697 | A | * 12/1996 | Rent ....................... 340/392.4 |
| 5,612,500 | A | * 3/1997 | Liang .......................... 84/402 |
| 5,647,298 | A | 7/1997 | Yancy |
| 6,067,934 | A | 5/2000 | Harwich |
| 6,124,782 | A | 9/2000 | Kraft, Sr. |

* cited by examiner

Primary Examiner—Robert P. Swiatek
(74) Attorney, Agent, or Firm—Brooks Kushman P.C.

(57) ABSTRACT

A caged-animal entertainment assembly that chimes or rings in response to animal engagement of an attractant suspended in the animal cage wherein the attractant may be separated or decoupled from a chiming assembly so the movement of the attractant by the caged animal no longer generates a chiming sound. When the attractant is attached or coupled to the chiming assembly, the animal generates the chiming sound by moving the attractant which, in turn, moves a support that is connected to a striker. The striker strikes the chimes or a bell to create the chiming sound.

16 Claims, 12 Drawing Sheets

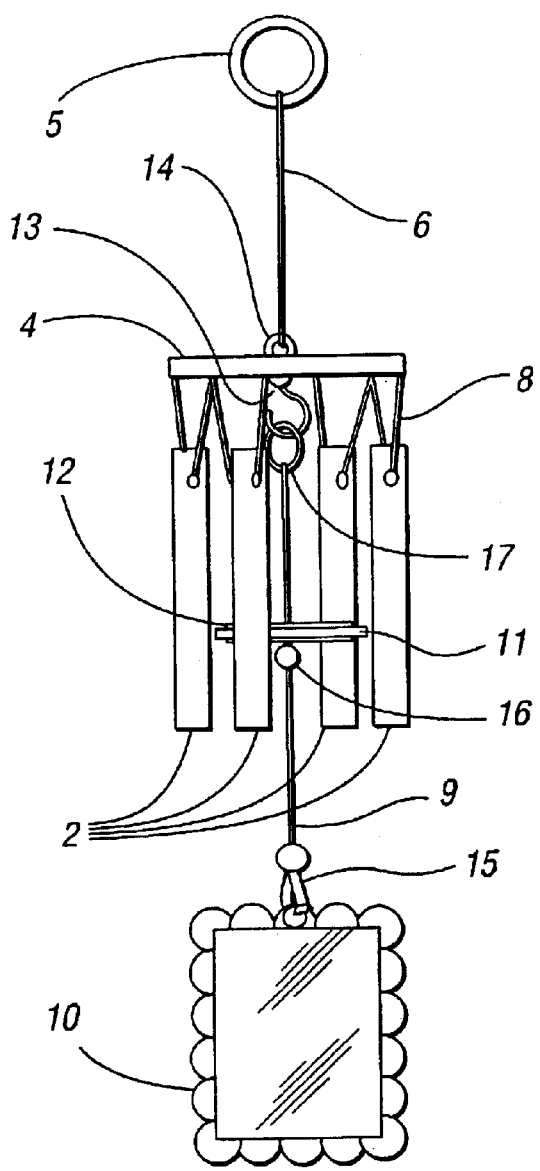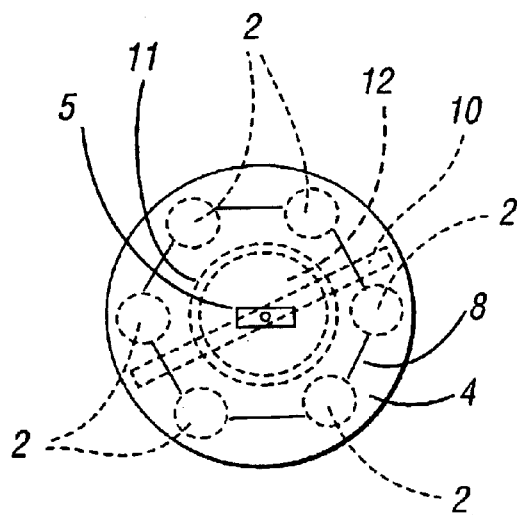

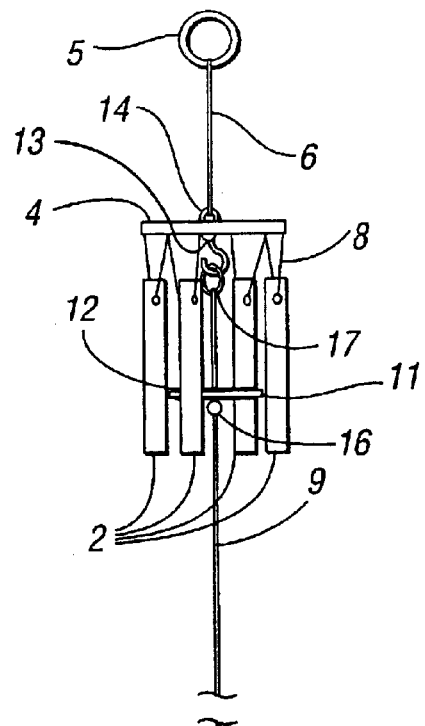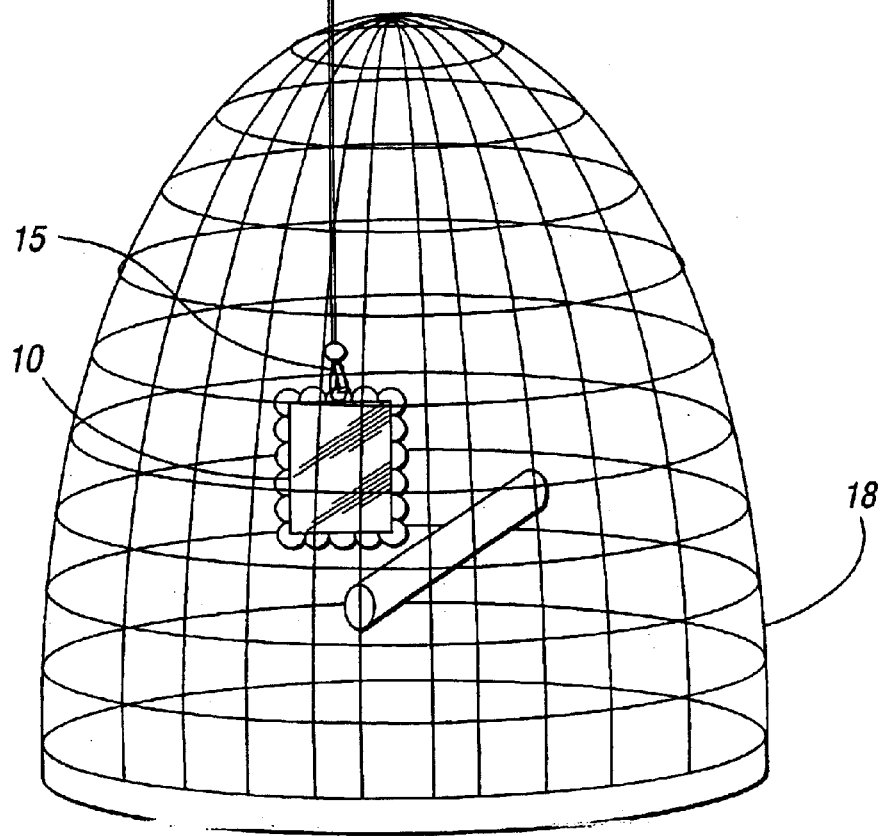
Fig. 3

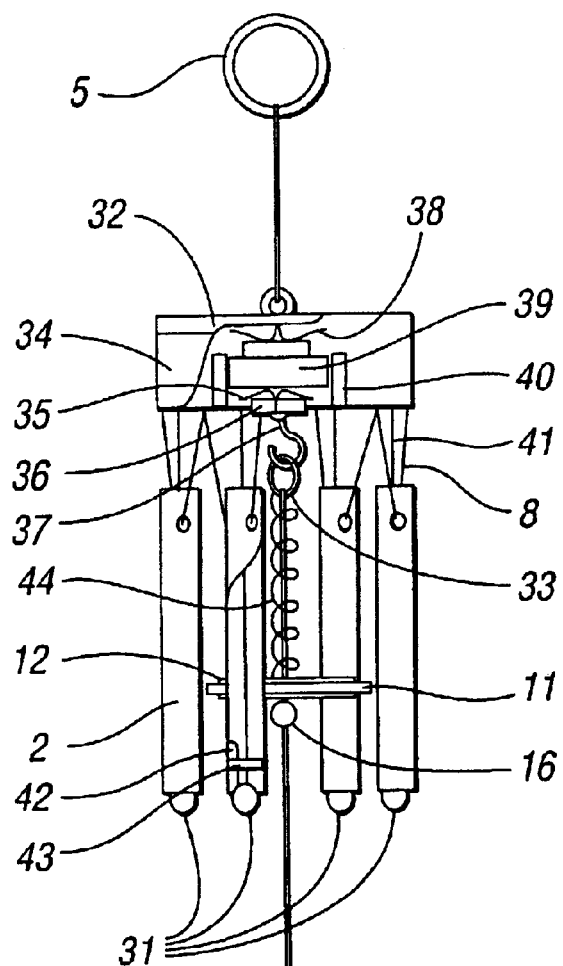
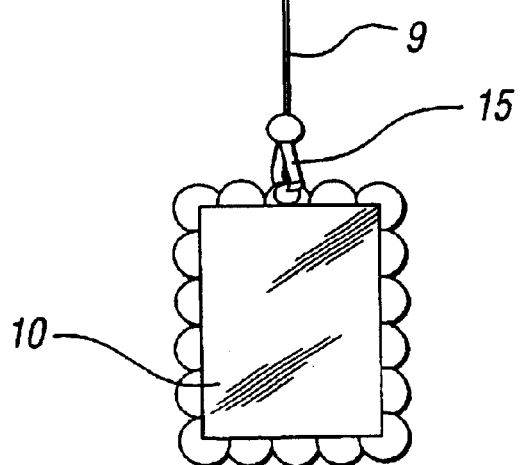
Fig. 11

ENTERTAINMENT ASSEMBLY FOR A CAGED ANIMAL

BACKGROUND OF THE INVENTION

1. Field of the Invention

This invention relates to entertainment assemblies for caged animals.

2. Background Art

Wind chimes are quite common, and a depiction of a typical wind chime is shown in FIG. 1a and FIG. 1b. The wind chime consists of a string or chain 6' to which a loop or hook 5' can be added to assist in its attachment to a tree, dwelling, or other position in the outdoors. A plate 4' is attached to the string of chain 6' through separate connector loops 7. Separate strings or chains 8' are used to fasten bells or chimes 2' to the plate 4'. Another separate string or chain support 9' is used to attach a striker 3' to the plate 4' such that its motion is independent of the upper string or chain 6'. The lower string or chain support 9' further extends to a paddle or sail 1'.

When winds blows the paddle or sail 1', the force of the wind causes the sail 1' to move the string or chain support 9' which causes the striker 3' to move. With sufficient force, the striker 3' will strike one or more of the chimes 2', thus producing randomized musical notes. The device just described is generally referred to as a "wind chime."

Wind chimes have been combined with feeders or lights for use outdoors to attract animals or birds. The wind chimes combined with animal feeders are normally suspended outdoors to attract wild animals and/or birds and chime in response to the wind or animal movement. Animal feeders have been designed to chime upon animal feeding without the necessity for movement of a paddle by the wind. The current feeders chime to announce the arrival of the wild animal or bird at the feeder.

U.S. Pat. No. 5,040,491 to Yancy discloses a bird feeder combined with chimes that chime in response to the arrival of a wild bird at the feeder. The feeder includes a support for suspending the feeder and the chimes on the same support.

U.S. Pat. No. 5,107,796 to Embrey discloses a bird feeder with multiple feeding reservoirs suspended from a canopy. The reservoirs serve as strikers, moving against a chime in response to wind or bird movement to produce a chiming sound.

U.S. Pat. Nos. 5,647,298 to Yancy, and U.S. Pat. No. D353.558 to Scott generally disclose wind chimes with animal or bird feeders. U.S. Pat. No. 2,707,937 to Herman, U.S. Pat. No. 4,542,714 to Ingraham, and U.S. Pat. No. 5,022,345 to Bolivar disclose bird toys with bells, all of which are suspended within a bird cage. U.S. Pat. No. 4,854,214 to Lowe discloses an illuminated wind chime.

SUMMARY OF THE INVENTION

An object of the present invention is to provide an improved entertainment assembly for a caged animal.

In carrying out the above object and other objects of the present invention, an assembly for entertaining an animal located within a cage is provided. The assembly includes at least one object giving a bell-like sound when struck. The assembly also includes a supporting device to suspend the at least one object outside the cage. The assembly further includes an animal attractant and a subassembly including a striker to selectively couple the animal attractant to and decouple the animal attractant from the at least one object in coupled and decoupled states, respectively, so that a predetermined amount of movement of the animal attractant causes the striker to strike the at least one object in the coupled state but not in the decoupled state.

At least part of the subassembly may suspend the animal attractant in the cage in both the coupled and uncoupled states.

At least part of the striker may suspend the animal attractant in the cage in the uncoupled state.

The entire striker may suspend the animal attractant in the cage in the uncoupled state.

The striker may include a plurality of separate parts, and one of the plurality of separate parts may suspend the animal attractant in the cage in the uncoupled state.

The plurality of parts may include a pair of magnetic parts, and one of the magnetic parts may suspend the animal attractant in the cage in the uncoupled state.

The at least one object may include a plurality of chimes that sound when struck by the striker.

The at least one object may be a bell that sounds when struck by the striker.

The attractant may include animal food or may include an animal toy.

The toy may be a mirror.

The subassembly may further include an elongated support wherein the striker is adjustably positioned on the elongated support so that the bell-like sound changes depending on striker position on the support.

The assembly may further include a support apparatus to support the supporting device above the cage.

The support apparatus may be a free-standing support apparatus.

The support apparatus may also be detachably removable from the cage.

The support apparatus may include a plurality of spaced-apart ladder rungs.

The at least one object may include a light which illuminates when the at least one object is struck by the striker.

This invention relates to a combination chime and toy or feeder for a domesticated animal. Domesticated animals suffer from boredom when caged. Birds, in particular, tend to remove their feathers to alleviate the boredom. This invention provides entertainment for caged animals to help prevent the boredom and generates a pleasant sound for the amusement of the caged animal and also for the benefit of the owner. The prior art does not properly address a chime and toy or feeder for a domesticated, caged animal.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1b is a top schematic view of the prior art wind chime of FIG. 1a;

FIG. 2a is a side schematic view of an embodiment of the invention wherein the attractant is a mirror;

FIG. 2b is a top schematic view of the embodiment of FIG. 2a;

FIG. 3 is a side schematic view of the embodiment of the invention shown in relation to an animal cage;

FIG. 11 is a side schematic view of a different embodiment of the invention similar to the embodiment of FIG. 2a but showing lights attached to each chime;

DETAILED DESCRIPTION OF THE PREFERRED EMBODIMENTS

Figure 1A:
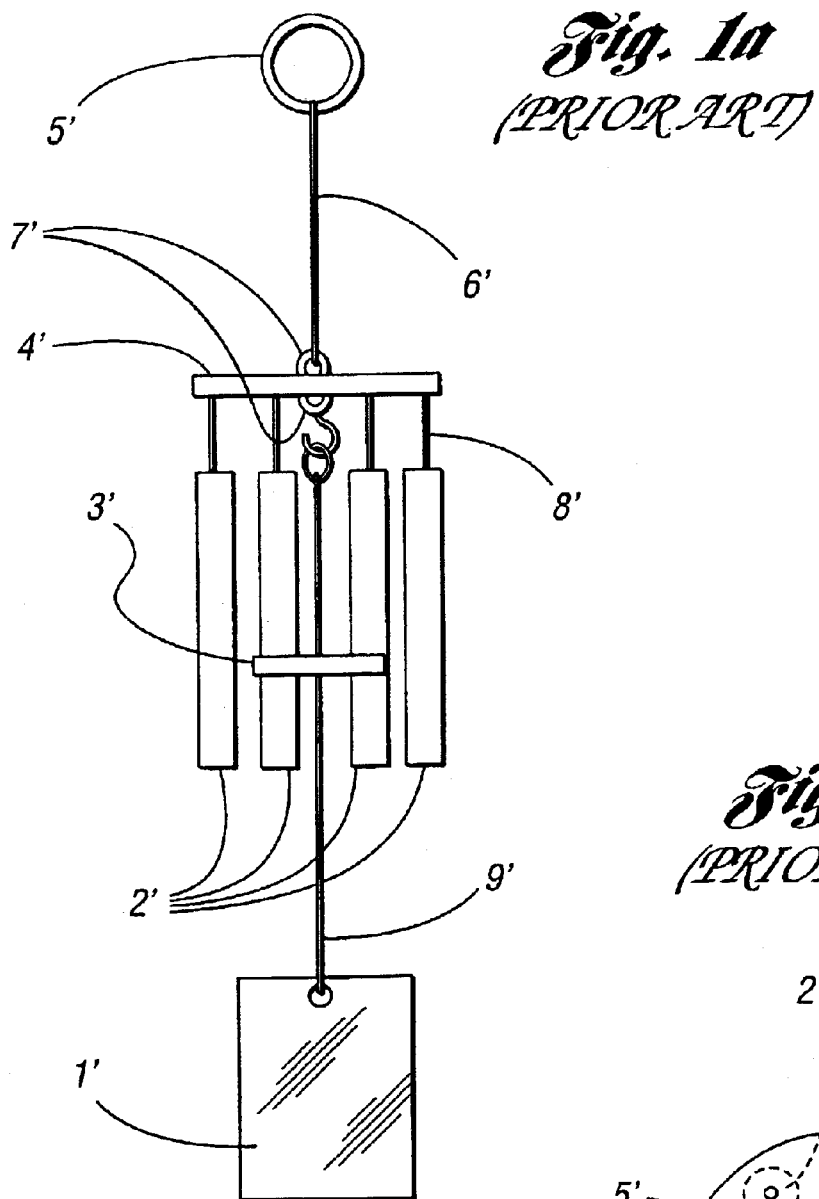
FIG. 1a is a side schematic view of a prior art wind chime.
Figure 1B:
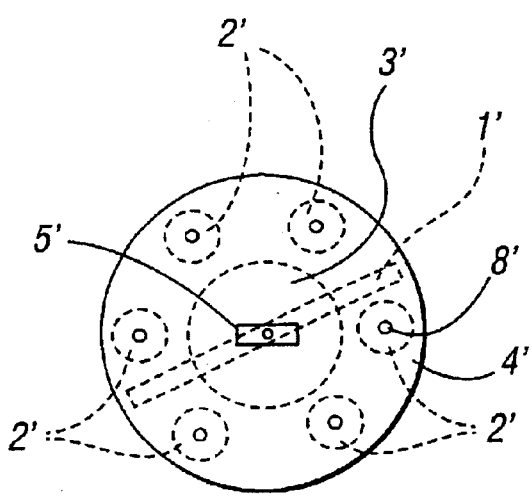

Referring now to the drawing figures, the numbering system of elements in the following embodiments of the invention are consistent with the element numbers in FIG. 1a, without the prime designation, indicating the same or similar elements. As shown in FIGS. 2a and 2b, the embodiment of the invention is similar to the basic wind chime shown in FIG. 1a with notable differences. The paddle or sail is replaced with an attractive bird toy 10 such that a bird pecking at the toy 10 causes the striker 12 to strike the chimes 2. Conventional paddles for wind chimes are heavy, and the pecking of small domestic birds will not supply enough force to cause the striker 12 to strike the chimes 2. Additionally, the striker 12 can be manufactured from a lightweight material, such as plastic, a lightweight metal, or a lightweight ceramic. To assist in passing force from the striker 12 to the chimes 2, a thin metallic, plastic, or ceramic ring 11 may be placed around the striker 12. The ring 11 may be made from a very light weight metal, such as aluminum.

The bird toy 10 may include a lightweight mirror, or any other style of bird toy, swing, or perch that attracts the bird to peck or move the toy 10 in such a manner as to cause the striker 12 to strike the chimes 2. The bird toy 10 may be interchanged with any commercial toy. The materials that compose the toy 10, the chimes 2, and the striker 12 are composed of substances know to be non-toxic to domestic birds. Additionally, components of the invention, except for the striker 12 and the chimes 2, are preferably constructed from plastic or acrylic to resist destruction by the bird.

In the embodiment of the invention shown in FIG. 2a, a clasp 15 connects the attractant 10 to the support 9 and the support 9 is suspended by a ring 17 that hangs from a hook 13 on the hanger 4. The hanger 4 is attached to a string or chain support 6 by a connector 14. A bead 16 adjustably positions the striker 12 along the support 9 to change the position at which the striker 12 strikes the chimes 2.

In the embodiment of the invention shown in FIG. 3, the chiming subassembly is designed to be suspended outside of an animal cage 18, with the toy 10 and support 9 hanging through wires or bars of an animal cage 18 and into a dwelling area of the animal. As a result, when this embodiment of the invention is used for small, domesticated birds, the birds can not come into contact with the chimes 2 unless purposely allowed out of the cage 18, an attribute that decreases the likelihood of injury to the bird by the bird chime toy 10 when the bird is enclosed in the small cage enclosure.

Figure 4:
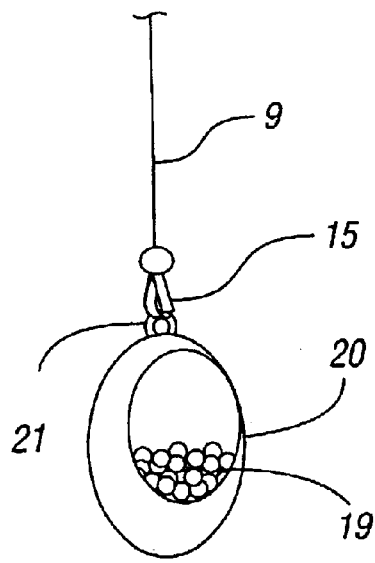
FIG. 4 is a broken away side schematic view showing bird seed in a small basket as an attractant.
Figure 5:
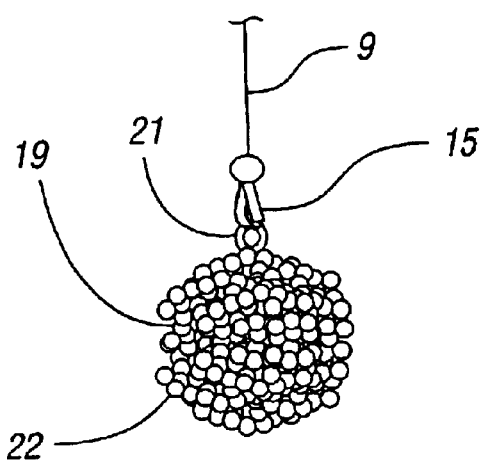
FIG. 5 is a broken away side schematic view showing compressed bird seed as an attractant.
Figure 6:
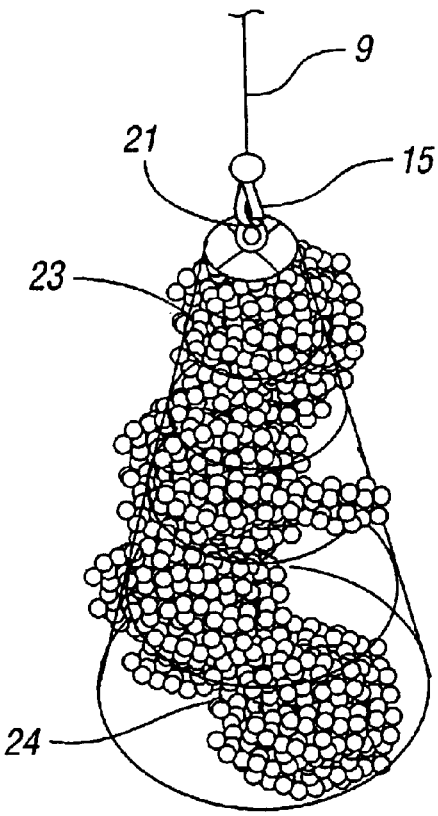
FIG. 6 is a broken away side schematic view showing a bird seed millet spray in a holder as an attractant.

The bird toy 10 can be replaced with food for the bird, as shown in FIGS. 4, 5, and 6. As shown in FIG. 4, a small basket 20 may be filled with food 19 and attached to the support 9 with a loop 21 and a clasp 15. FIG. 5 shows a compressed bird seed food pellet, wafer, or bar 22 directly attached to the support 9 by a loop 21 and a clasp 15. FIG. 6 shows a millet spray 24 and holder 23 attached to the support 9 using a loop 21 and a clasp 15.

Figure 7:
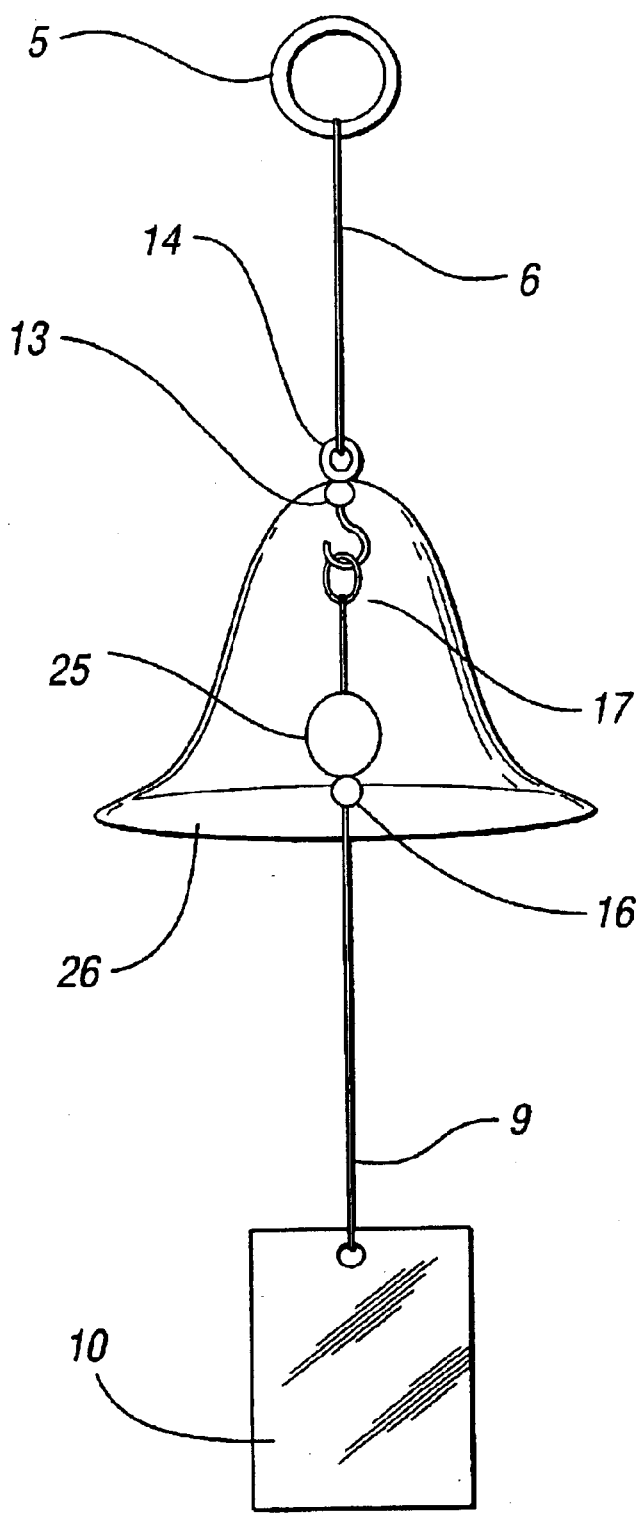
FIG. 7 is a side schematic view of another embodiment of the invention showing a bell with an adjustable striker.

The chiming subassembly may be comprised of a bell 26 instead of chimes, as shown in FIG. 7. The bell striker 25 can be adjustable, using a bead 16, slidable along the support 9 to which the toy 10 is attached to change the position at which the striker 25 strikes the bell 26. The bell 26 is also designed to be suspended outside the animal enclosure.

Figure 8:
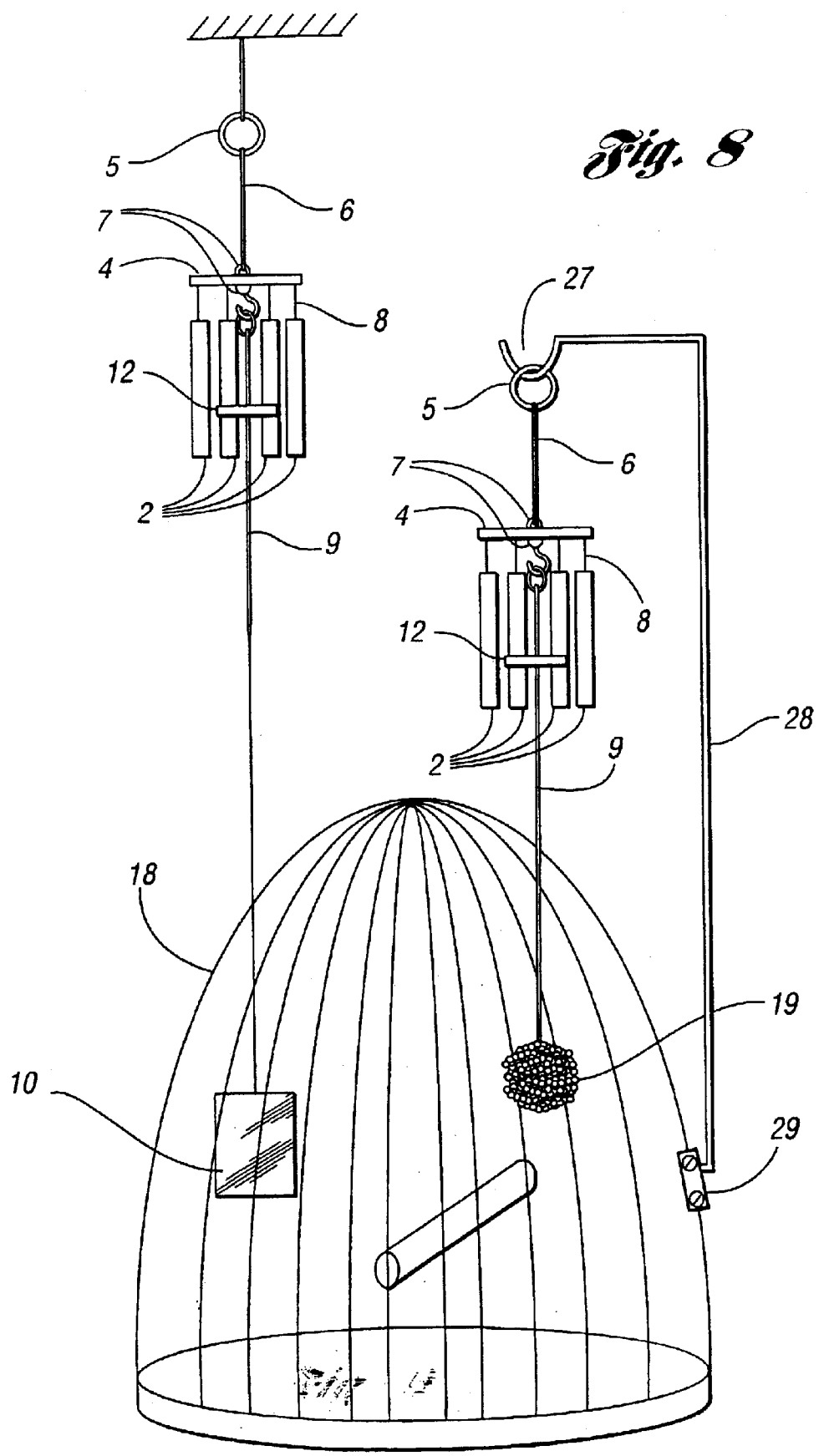
FIG. 8 is a side schematic view illustrating two other embodiments of the invention in relation to the animal cage, one suspended from a ceiling and the other suspended from a detachable support assembly on the animal cage.

As shown in FIG. 8, the entertainment assembly can be suspended from the ceiling such that the chiming subassembly remains outside the cage 18 and the toy 10, suspended by the support 9, hangs into the cage 18 through the cage wires or bars. Alternatively, the entertainment assembly can be suspended from a hook 27 formed from a rod 28 and fastened with a fastener 29 to the cage 18. The support apparatus is detachable from the cage 18. The chiming subassembly is suspended outside of the cage 18 with the support 9 and food 19 suspended in the cage 18.

Figure 9:
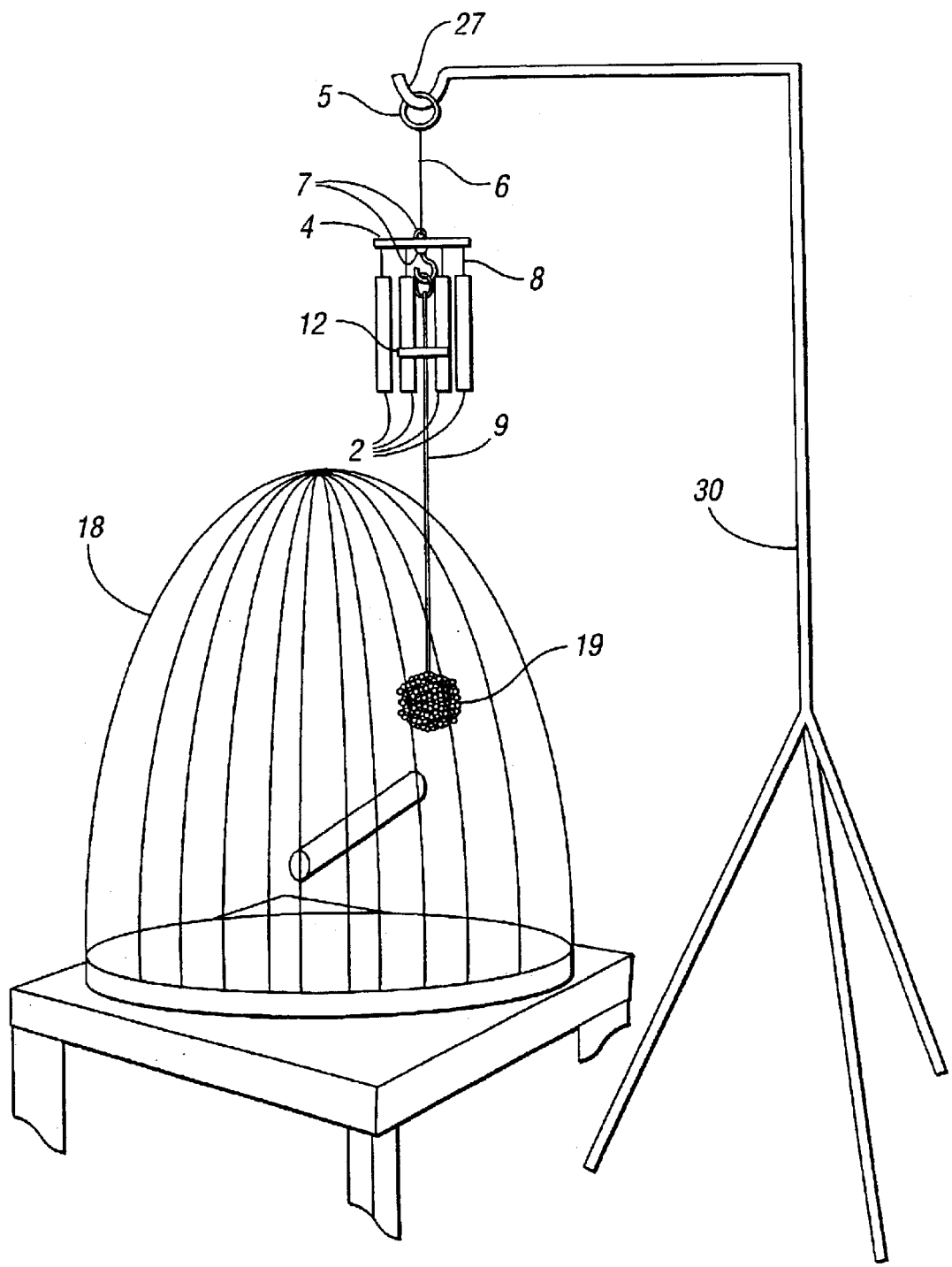
FIG. 9 is a side schematic view of an embodiment of the invention suspended from a free standing support.

Larger animals may require a hanging system that does not attach to the ceiling or cage 18, but instead is a free standing structure as shown in FIG. 9. The structure would have a hook 27 formed from the free standing structure 30. The chiming subassembly remains outside of the cage 18 and the attractant 19 is suspended on the support 9 through the cage wires into the cage 18.

Figure 10:
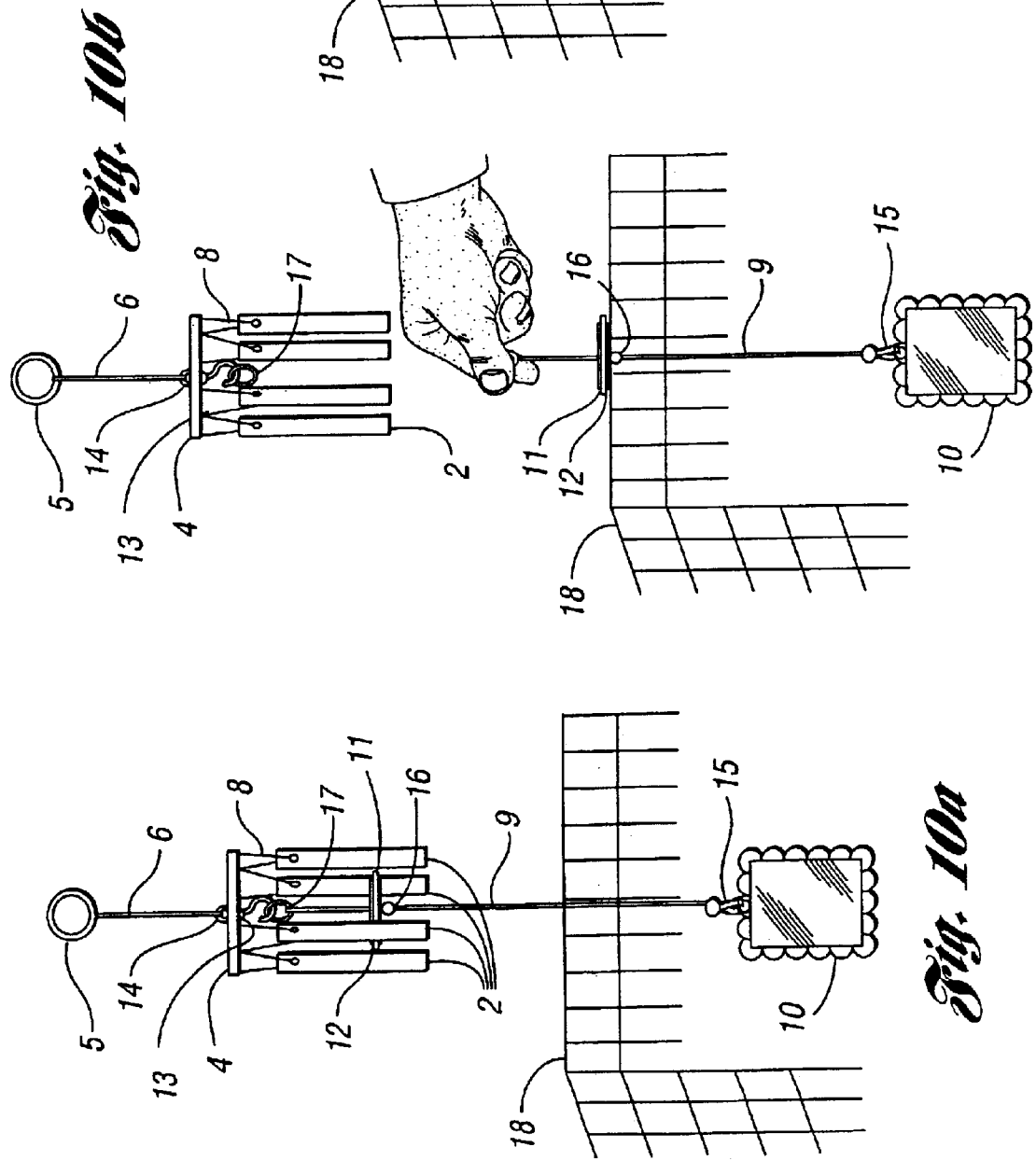
FIGS. 10a, 10b, and 10c are partially broken away schematic views showing (1) the decoupling of the attractant, support, and striker from its chiming subassembly and (2) securing the attractant and support to the animal cage using the striker.

At night, domestic birds are often covered with a sheet or cloth to facilitate proper sleeping habits. The chiming subassembly is designed such that the toy 10, the support 9 and the striker 12 can be detached or decoupled from the upper plate 4 at the connector 13, and the toy 10 and the support 9 can either be removed from the cage 18, or the toy 10 and the support 9 can be lowered into the cage 18 such that the toy 10 and support 9 are suspended in the cage 18 by the striker 12 as shown in FIGS. 10a, 10b and 10c.

The bead 16 is fastened to the support 9 such that the striker 12 is prevented from sliding further down the support 9. The design allows for the striker 12 to slide up toward the connector ring 17 when the toy 10 and support 9 are lowered into the cage 18. As a result, the toy 10 and the support 9 can be easily lowered into the cage 18, and no portion of the entertainment assembly obstructs the operator from covering or moving the cage 18.

The chiming subassembly can have other features that are attractive to caged animals and domesticated birds, such as lights 31 that illuminate when the toy 10 is pecked. FIG. 11 shows the entertainment assembly with lights 31 on the ends of chiming subassembly. The entertainment assembly shown in FIG. 2a can be modified to accommodate the lights 31 and a means for energizing the lights 31 which may be photodiodes.

Modifications of the embodiment of the invention shown in FIG. 2a are shown as follows in FIG. 11. The hangar body 34 is hollow such that a battery 39 can be inserted. The battery 39 is held in place by springs 35 and 38 and an insulating holder 40. A metallic spring 35 is connected to the metallic conductive hook 37. A metallic conductive ring 33 is connected to the metallic conductive striker 12 and ring 11 by a thin wire 44. The upper spring 38 is connected to the opposite terminal of the battery 39 and to the conductive hangar lid 32 and body 34.

Thin insulated wires 41 drop through the chimes 2 and connect to one terminal of the insulating socket 43 for a light such as a light emitting diode 31. The other terminal on the socket 43 is connect directly to the metal chime 2. The light emitting diode 31 is plugged into a socket 43. When a bird pecks the toy 10 or food 19, the striker 12 swings and causes the metal ring 11 to connect the circuit between the battery 39 and the light emitting diode 31. The light 31 momentarily turns on. Each chime 2 has a light emitting diode 31 in it, preferably of different colors. The power needed to light the diodes 31 is low, hence the device is harmless to human or animal touch.

Figure 12:
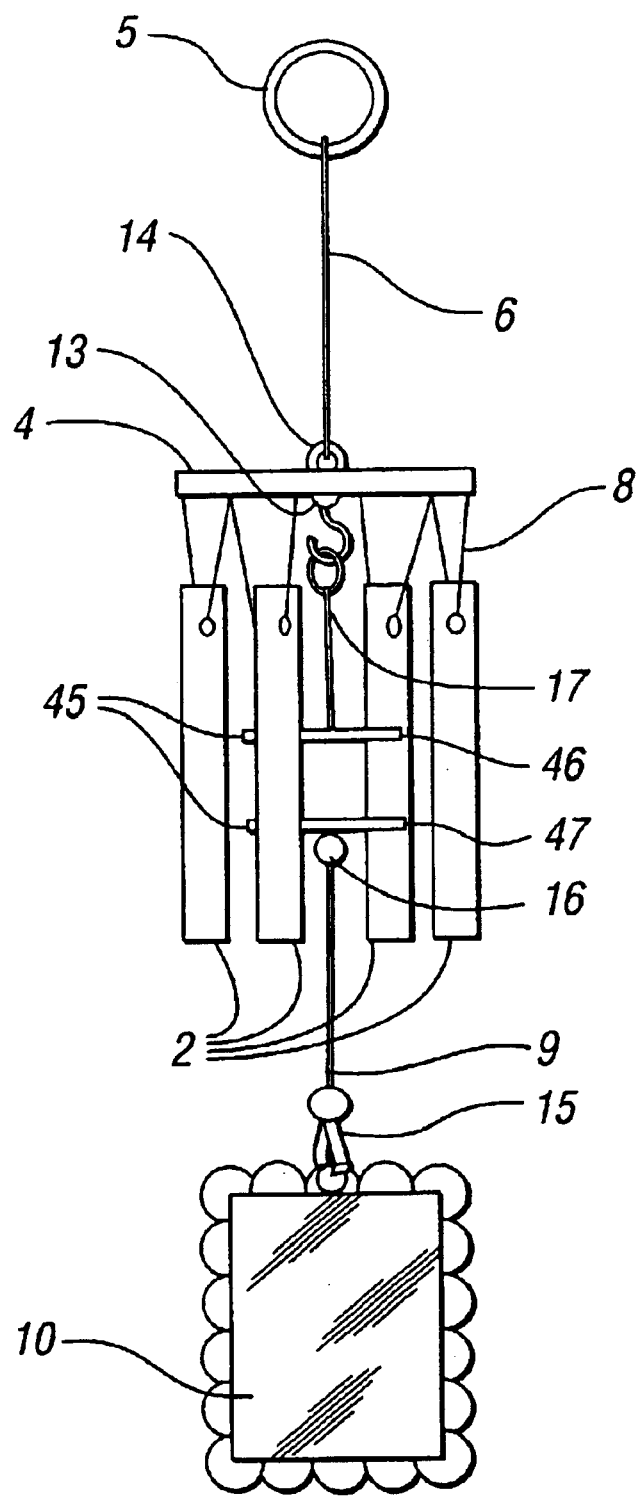
FIG. 12 is a side schematic view of another embodiment of the invention similar to the embodiment of FIG. 2a and showing the lower part of a magnetic striker in the process of removal from the rest of the assembly.

FIG. 12 shows an alternative mechanism for decoupling the chiming subassembly from the attractant 10 to prevent sound caused by movement of the attractant 10 by the animal. The striker 45 may be made of an upper magnet part 46 and a lower magnet part 47. Generally the chimes 2 are composed of aluminum so the magnetic striker 45 will not interfere with the chimes 2. The lower magnet part 47 may be decoupled from the chime assembly with the attractant 10 and support 9 attached to the lower magnet part 47. The lower magnet part 47 can engage the animal cage 18 and suspend the support 9 and attractant 10 in the cage 18 so that the chimes or bell no longer sounds when the animal moves the attractant 10.

Figure 13:
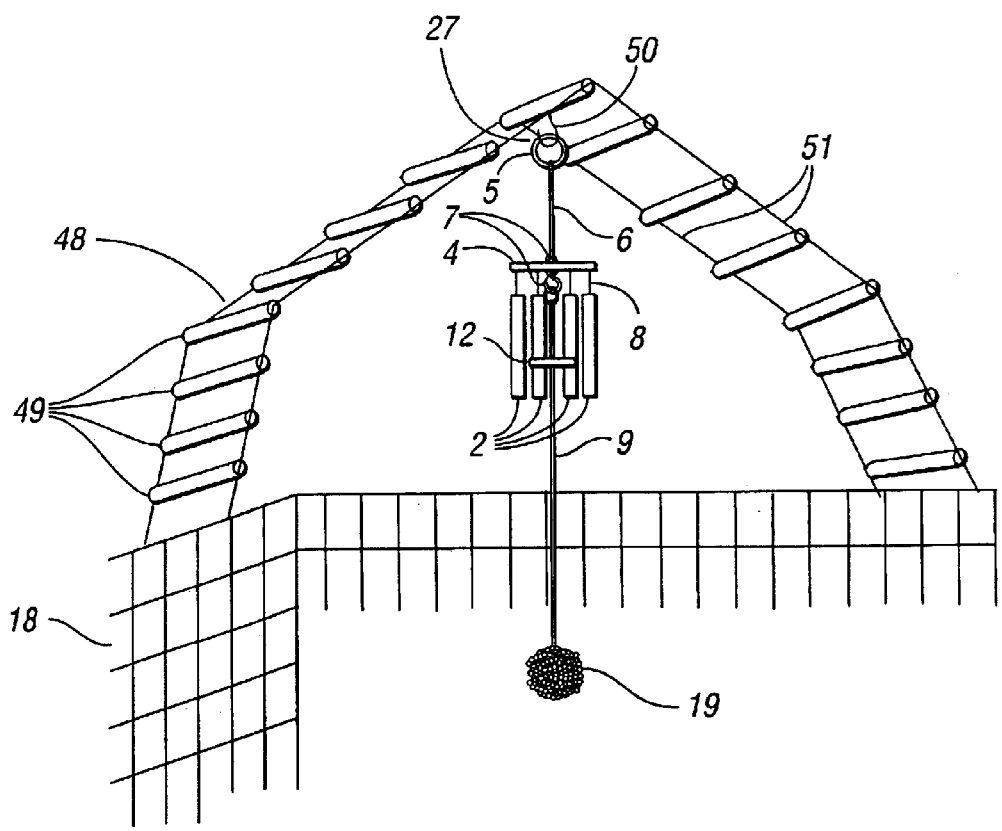
FIG. 13 is a partially broken away schematic view showing a ladder assembly straddling the animal cage from which an assembly of the invention is suspended.

Shown in FIG. 13 is an alternative apparatus for suspending the chiming subassembly over an animal cage 18. The suspension mechanism includes a ladder assembly 48 that straddles the animal cage 18. The chiming subassembly hangs from a hook 50 connected underneath the ladder assembly 48. The ladder sidebars 51 and rungs 49 may be fabricated from plastic, wood, metal, or some other material capable of holding the weight of a small animal. The chiming subassembly is suspended outside of the cage 18 with the support 9 and food 19 suspended in the cage 18.

Figure 14:
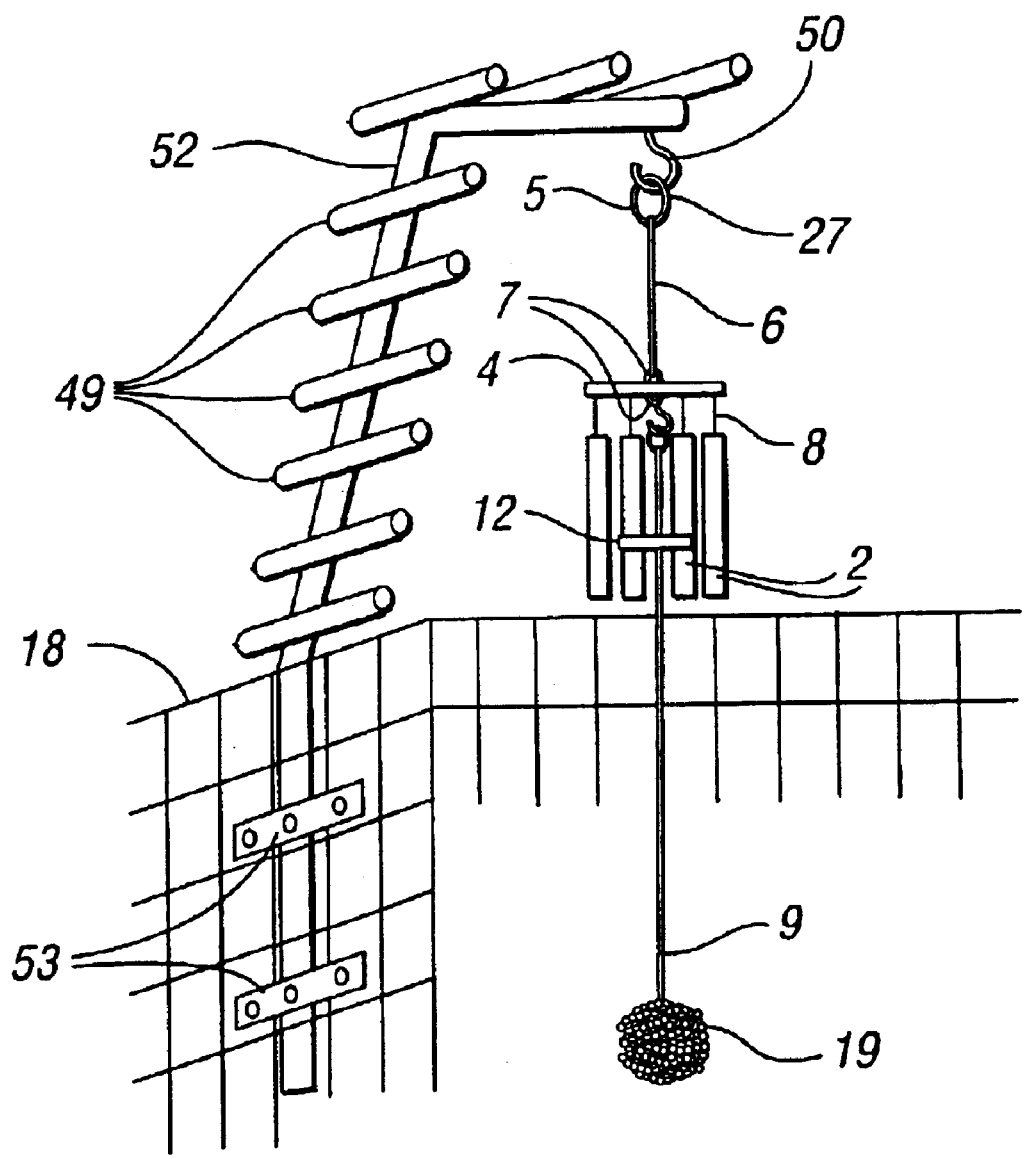
FIG. 14 is a partially broken away schematic view showing a detachable support assembly for the assembly of the invention; a ladder structure has been added to the detachable support assembly.

Shown in FIG. 14 is an entertainment assembly suspended from a hook 50 attached to the bottom of a rod 52 that is attached to the cage 18 with brackets 53. The support apparatus is detachable from the cage 18. The support apparatus has ladder rungs 49 for the small animal to climb upon. The chiming subassembly is suspended outside of the cage 18 with the support 9 and food 19 suspended in the cage 18. The rod 52 and rungs 49 may be fabricated from plastic, wood, metal or some other material capable of holding the weight of a small animal.

It is also understood, of course, that while the form of the invention herein shown and described constitutes a preferred embodiment of the invention, it is not intended to illustrate all possible forms thereof. It should also be understood that the words used in the specification are words of description rather than limitation and various changes may be made without departing from the spirit and scope of the invention.

What is claimed is:

1. An assembly for entertaining an animal located within a cage, the assembly comprising:
    at least one object giving a bell-like sound when struck;
    a supporting device to suspend the at least one object outside the cage;
    an animal attractant; and
    a subassembly including a striker to selectively couple the animal attractant to and decouple the animal attractant from the at least one object in coupled and decoupled states, respectively, so that a predetermined amount of movement of the animal attractant causes the striker to strike the at least one object in the coupled state but not in the decoupled state wherein at least part of the subassembly suspends the animal attractant in both the coupled and uncoupled states.

2. The assembly as claimed in claim 1, wherein at least part of the striker suspends the animal attractant in the uncoupled state.

3. The assembly as claimed in claim 2, wherein the entire striker suspends the animal attractant in the uncoupled state.

4. The assembly as claimed in claim 2, wherein the striker includes a plurality of separate parts and wherein one of the plurality of separate parts suspends the animal attractant in the uncoupled state.

5. The assembly as claimed in claim 4, wherein the plurality of parts includes a pair of magnetic parts and wherein one of the magnetic parts suspends the animal attractant tar in the uncoupled state.

6. The assembly as claimed in claim 1, wherein the at least one object includes a plurality of chimes that sound when struck by the striker.

7. The assembly as claimed in claim 1, wherein the at least one object is a bell that sounds when struck by the striker.

8. The assembly as claimed in claim 1, wherein the attractant includes animal food.

9. The assembly as claimed in claim 1, wherein the attractant includes an animal toy.

10. The assembly as claimed in claim 9, wherein the toy is a mirror.

11. The assembly as claimed in claim 1, wherein the subassembly further includes an elongated support and wherein the striker is adjustably positioned on the elongated support so that the bell-like sound changes depending on striker position on the support.

12. The assembly as claimed in claim 1, further comprising a support apparatus to support the supporting device above the cage.

13. The assembly as claimed in claim 12, wherein the support apparatus is a free-standing support apparatus.

14. The assembly as claimed in claim 12, wherein the support apparatus is detachably removable from the cage.

15. The assembly as claimed in claim 1, wherein the at least one object includes a light which illuminates when the at least one object is struck by the striker.

16. An assembly for entertaining an animal located within a cage, the assembly comprising:
    at least one object giving a bell-like sound when struck;
    a supporting device to suspend the at least one object outside the cage;
    a support apparatus to support the supporting device above the cage;
    an animal attractant; and
    a subassembly including a striker to selectively couple the animal attractant to and decouple the animal attractant from the at least one object in coupled and decoupled states, respectively, so that a predetermined amount of movement of the animal attractant causes the striker to strike the at least one object in the coupled state but not in the decoupled state wherein the support apparatus includes a plurality of spaced-apart ladder rungs.

* * * * *